United States Patent [19]

Baatz

[11] Patent Number: 4,590,796

[45] Date of Patent: May 27, 1986

[54] APPARATUS AND METHOD FOR PULSATION DAMPING AND FLOW MEASUREMENT IN LIQUID FUEL SYSTEM

[75] Inventor: Wilfried Baatz, Bellevue, Wash.

[73] Assignee: FloScan Instrument Co., Inc., Seattle, Wash.

[21] Appl. No.: 693,875

[22] Filed: Jan. 23, 1985

[51] Int. Cl.[4] .......................................... G01M 15/00
[52] U.S. Cl. ..................................... 73/113; 137/207
[58] Field of Search ..................... 73/113, 114, 119 A; 137/593, 207; 417/540, 542, 543

[56] References Cited

U.S. PATENT DOCUMENTS

| | | | |
|---|---|---|---|
| 2,100,404 | 11/1937 | Mason et al. | 417/543 |
| 2,681,013 | 6/1954 | Ogdon | 417/543 |
| 3,242,947 | 3/1966 | Mizma | 137/593 |
| 3,945,767 | 3/1976 | Rokadia | 417/540 |
| 4,079,623 | 3/1978 | Erwin, Jr. | 73/113 |
| 4,141,240 | 2/1979 | Usui et al. | 73/114 |

*Primary Examiner*—Jerry W. Myracle
*Assistant Examiner*—Robert R. Raevis
*Attorney, Agent, or Firm*—Christensen, O'Connor, Johnson & Kindness

[57] ABSTRACT

An apparatus and method are disclosed for reducing flow pulsations and measuring fuel flow in a fuel system for a liquid fuel engine. The engine (54) has associated with it a fuel tank (30) and a pump (32) for causing fuel to flow through a fuel flow path from the fuel tank through the pump to the engine. In one embodiment, the invention comprises a flow sensor (50), gas inlet means (62), and a pulsation damper (46) that includes a chamber (70) in communication with the fuel flowing through the pulsation damper. The flow sensor is positioned in the fuel flow path (44, 48, 52) between the pump and the engine, and serves to measure the rate of fuel flowing to the engine. The gas inlet means introduces gas into the fuel flow path, and preferably directly into the chamber. The pulsation damper is located in the fuel flow path (44, 48) between the pump and the flow sensor, and operates to damp flow pulsations in the fuel and separate the gas introduced by the gas inlet means from the fuel such that the gas does not reach the engine.

25 Claims, 3 Drawing Figures

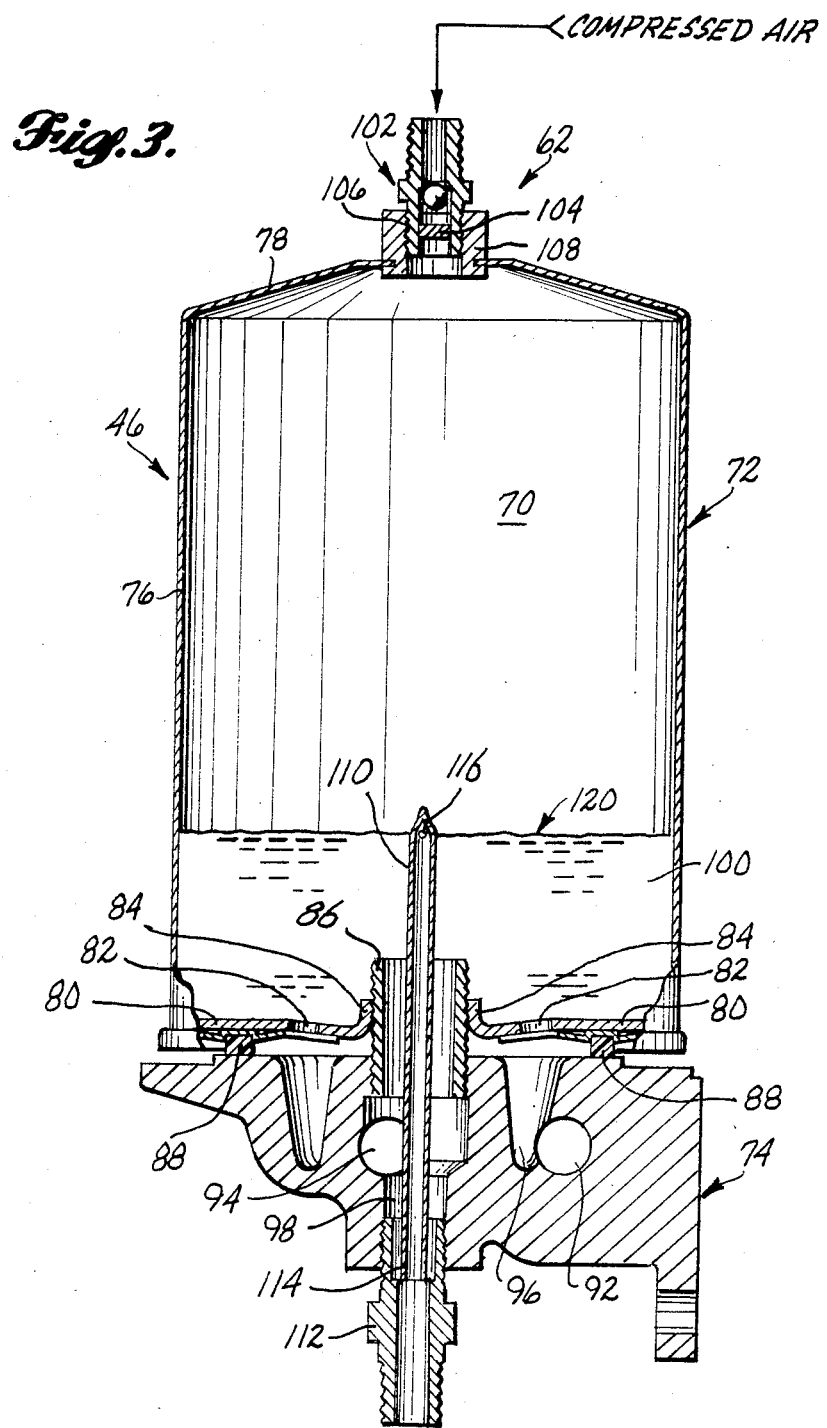

APPARATUS AND METHOD FOR PULSATION DAMPING AND FLOW MEASUREMENT IN LIQUID FUEL SYSTEM

FIELD OF THE INVENTION

The present invention relates to fuel systems for liquid fuel engines and, in particular, to a technique for damping flow pulsations and measuring fuel flow in fuel systems for liquid fuel engines.

BACKGROUND OF THE INVENTION

Many diesel engine fuel systems employ low cost, reliable, piston-type fuel transfer pumps that create large flow pulsations in the fuel line downstream from the pump. While these pulsations have no adverse affect upon the performance of the fuel system or the engine, they can have a very detrimental effect upon the accuracy of a flow transducer used to measure the rate of fuel flow to the engine.

To accurately measure fuel flow in diesel fuel systems that include piston-type transfer pumps, it is necessary either to damp the flow pulsations, or to protect the flow transducers from the pulsations with a bypass diaphragm or equivalent device. However, the bypass approach is impractical in many diesel engine applications because the pulsation volumes are too large.

SUMMARY OF THE INVENTION

In one aspect, the present invention provides an apparatus for reducing flow pulsations in a fuel system for a liquid fuel engine. The fuel system comprises a fuel tank and a pump for causing fuel to flow through a fuel flow path from the fuel tank through the pump to the engine. The apparatus comprises gas inlet means for introducing gas into the fuel flow path, and damping means located in the fuel flow path between the pump and the engine. The damping means damps flow pulsations in the fuel, and substantially separates the gas from the fuel such that the gas does not reach the engine. The damping means includes means for containing a volume of gas in communication with the fuel flowing through the damping means, such that flow pulsations in the fuel are transmitted to and damped by the gas.

In another aspect, the present invention provides an apparatus for measuring the fuel consumed by a liquid fuel engine. The engine has associated with it a fuel tank and a pump for causing fuel to flow through a fuel flow path from the fuel tank through the pump to the engine. The apparatus comprises a flow sensor positioned in the fuel flow path between the pump and the engine, gas inlet means for introducing gas into the fuel flow path, and damping means located in the fuel flow path between the pump and flow sensor. The damping means damps flow pulsations in the fuel, and substantially separates the gas from the fuel such that the gas does not reach the engine. The damping means includes means for containing a volume of gas in communication with the fuel flowing through the damping means, such that the flow pulsations in the fuel are transmitted to and damped by the gas.

In another aspect, the present invention provides a method for reducing flow pulsations in a fuel system for a liquid engine. The fuel system comprises a fuel tank and a pump for causing fuel to flow through a fuel flow path from the fuel tank through the pump to the engine. The method comprises introducing gas into the fuel flow path, and providing a chamber in the fuel flow path between the pump and the engine for separating the gas from the fuel. Flow pulsations in the fuel are transmitted to and damped by the gas in the chamber.

In a further aspect, the present invention provides a method for measuring the fuel consumed by a liquid fuel engine that has associated with it a fuel tank and a pump for causing fuel to flow through a fuel flow path from the fuel tank through the pump to the engine. The method comprises measuring the rate of fuel flow to the engine by means of a flow sensor positioned in the fuel flow path between the pump and the engine, introducing gas into the fuel flow path, and providing a chamber in the fuel flow path between the pump and the flow sensor for separating the gas from the fuel. Flow pulsations in the fuel are transmitted to and damped by the gas in the chamber.

Use of a gas filled chamber has several advantages over alternative pulsation dampers such as spring loaded diaphragms, hollow rubber balls, or closed cell foam. Gas (e.g., air) exhibits no inertia or hysteresis, and is not physically affected by diesel fuel. Furthermore, the operation of an air filled chamber can be made insensitive to system pressure, whereas a spring loaded diaphragm damper would require the spring strength to be matched to the fuel system pressure. In practice, however, a simple air filled pulsation damping chamber would be rendered inoperable because the chamber would slowly fill with diesel fuel as air was entrained by the fuel flowing through the chamber. The apparatus of the present invention overcomes this problem by providing gas inlet means to continuously replenish the supply of air in the damping chamber.

BRIEF DESCRIPTION OF THE DRAWINGS

FIG. 3 is a cross-sectional view of the damping chamber of FIG. 2.

DETAILED DESCRIPTION OF THE INVENTION

Figure 1:
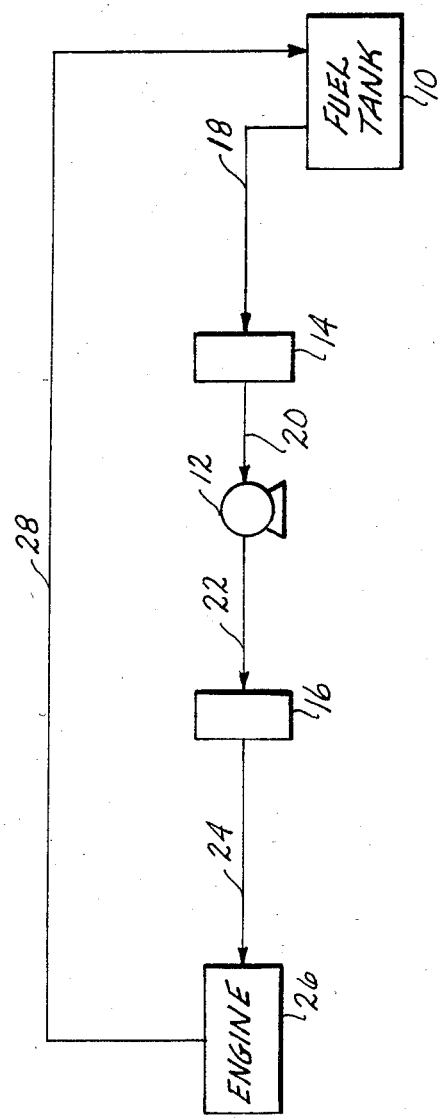
FIG. 1. is a block diagram of a conventional diesel fuel system.

Referring initially to FIG. 1, a conventional diesel fuel system is illustrated comprising fuel tank 10, transfer pump 12, primary filter 14 and secondary filter 16. Pump 12 draws liquid fuel out of fuel tank 10 through fuel line 18, primary filter 14 and fuel line 20. From the pump 12, the fuel flows through fuel line 22, secondary filter 16 and fuel line 24 to engine 26. Unused fuel is returned from the engine to fuel tank 10 via return line 28.

Figure 2:
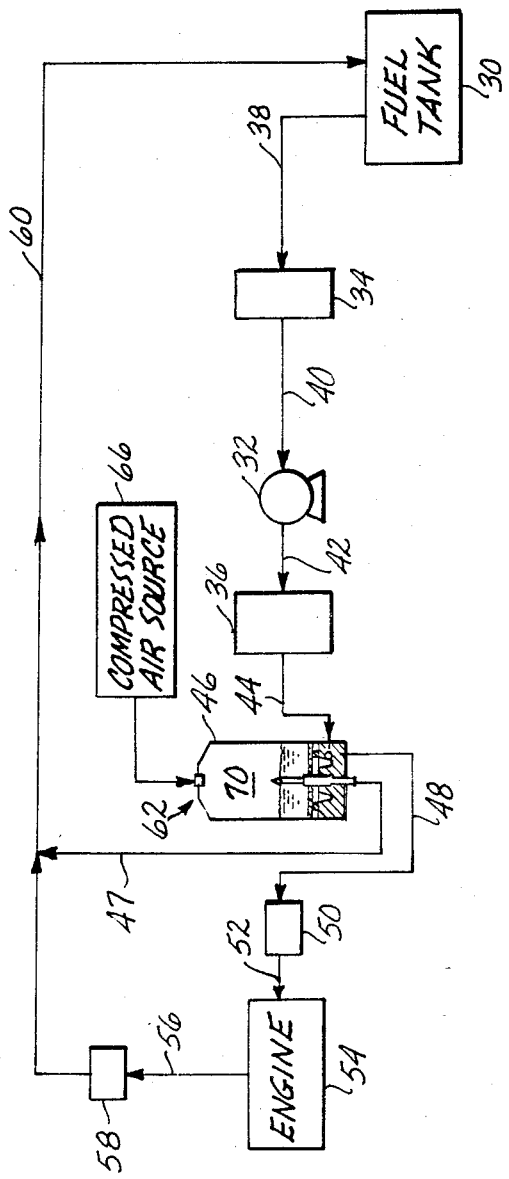
FIG. 2 is block diagram of a diesel fuel system including the flow measurement and pulsation damping apparatus of the present invention.

FIG. 2 sets forth a block diagram of a diesel fuel system that includes the pulsation damping and flow measurement apparatus of the present invention. The fuel system of FIG. 2 includes fuel tank 30, pump 32, primary filter 34 and secondary filter 36, such components being similar to the corresponding components of the conventional fuel system of FIG. 1. However the fuel system of FIG. 2 also includes pulsation damper 46, gas inlet means 62, forward flow sensor 50 and return flow sensor 58. Pump 32 draws fuel out of fuel tank 30 through fuel line 38, primary filter 34 and fuel line 40. After passing through pump 32, the fuel flows through fuel line 42, secondary filter 36 and fuel line 44 into pulsation damper 46. The pulsation damper includes chamber 70 in communication with fuel line 44. Gas inlet means 62 introduces air from compressed air source 66 directly into chamber 70. Pulsation damper 46 separates the air from the fuel, routing the air (and some fuel) to line 47 and essentially air-free fuel to fuel line 48. Pulsation damper 46 also reduces flow pulsations caused by pump 32, such that the pulsation amplitude in fuel line 48 is appreciably less than the pulsation amplitude in fuel line 44. The fuel routed to fuel line 48 flows through forward flow sensor 50 and fuel line 52 to engine 54. Fuel not consumed in engine 54 is returned to fuel tank 30 through fuel line 56, return flow sensor 58 and return line 60. Air and fuel flowing out of pulsation damper 46 through line 47 are also returned to the fuel tank via return line 60.

The rate of fuel consumption of engine 54 is equal to the fuel flow measured by forward flow sensor 50 less the fuel flow measured by return flow sensor 58. The signals from the forward and return flow sensors may be connected to an appropriate flow metering system that is capable of electronically subtracting the sensor signals and providing an indication of net fuel flow. In many diesel fuel systems, forward flow sensor 50, in order to accurately measure fuel flow, must be at least partially isolated from the flow pulsations caused by pump 32. Such isolation is achieved by the present invention by means of pulsation damper 46 operating in conjunction with gas inlet means 62.

The purpose of gas inlet means 62 is to provide a continuous stream of air for use by pulsation damper 46. The gas inlet means may therefore be positioned anywhere in the fuel flow path between fuel tank 30 and pulsation damper 46. However, it is preferred to position the gas inlet means such that it introduces air directly into chamber 70, as illustrated in FIG. 2. Positioning the gas inlet means to introduce air directly in chamber 70 avoids passing an air/fuel mixture through pump 32, and also results in a more economical and readily installed apparatus. Gas inlet means 62 may comprise any suitable regulator capable of passing air or other gases at a controlled rate into the fuel flow path. An air flow rate of approximately 1 cubic foot/hour at 28 psi is sufficient to maintain a substantial volume of air in damping chamber 46. The gas inlet means derives its air from compressed air source 66 which may, for example, comprise the primary receiver of the vehicle braking system. For certain applications, gas inlet means 62 may derive its air supply directly from the atmosphere through a bleed-in orifice or the like. However, it is preferred to connect the gas inlet means to a source of compressed air, because of the clogging problem associated with the use of a small bleed-in orifice.

Referring now to FIG. 3, pulsation damper 46 comprises container 72 and base 74. Container 72 comprises cylindrical sidewall 76, upper wall 78 and lower wall 80, the interior of container 72 comprising chamber 70. Lower wall 80 includes a plurality of openings 82 and a central portion 84 that is shaped to form an internally threaded bore. Openings 82 are circularly disposed around central portion 84. Container 72 is secured to base 74 by means of externally threaded fitting 86 and circular gasket 88.

Base 74 comprises inlet orifice 92, outlet orifice 94, circular V-shaped recess 96 and central bore 98. Fitting 86 is threaded into the upper end of central bore 98. Inlet orifice 92 communicates with recess 96, and recess 96 is in turn positioned under openings 82 in lower wall 80. Inlet orifice 92 is connected to fuel line 44 (FIG. 2), such that fuel from pump 32 can flow through inlet orifice 92, recess 96, and openings 82 into chamber 70. Gasket 88 prevents fuel leakage at the interface between container 72 and base 74. The bottom surface of lower wall 80 includes indentations shaped to receive gasket 88, to prevent lateral migration of the gasket. Outlet orifice 94 is connected to fuel line 48 (FIG. 2), and communicates with central bore 98 of base 74. Fuel 100 that accumulates in chamber 70 can therefore flow out of the chamber through fitting 86, central bore 94 and outlet orifice 94 into fuel line 48.

Gas inlet means 62 comprises check valve 102 and fritted disk 104 mounted in valve housing 106. Valve housing 106 is in turn mounted in upper wall 78 of container 72 by boss 108. Check valve 102, illustrated schematically in FIG. 3, permits compressed air to flow through the check valve into chamber 70, but blocks reverse airflow. Fritted disk 104 regulates the flow of air to a desired rate, e.g., 1 cubic foot/hour at 28 psi.

Pulsation damper 46 further comprises exit tube 110 extending downward from chamber 70 through fitting 86 into bore 98 of base 74. The lower end of exit tube 110 is mounted by bushing 114 in fitting 112. The upper end of exit tube 110 includes two small orifices 116, one orifice being illustrated in FIG. 3. Fitting 112 is connected to line 47 (FIG. 2). The height of orifices 116 in chamber 70 establishes the height of the surface 120 of fuel 100 in the chamber. A mixture of air and fuel therefore flows through orifices 116 into exit tube 110, fitting 112 and into line 47. The air/fuel mixture is routed from line 47 back to fuel tank 30 via return line 60. Orifices 116 are preferably sized to limit the liquid fuel return flow, when the orifices are submerged, to 2–4 gallons per hour. Such a rate of fuel flow through line 47 does not result in a significant load increase on pump 32. The height of orifices 116 above fitting 86 should be sufficient to avoid entrainment of air in the fuel flowing out of fitting 86 to the engine. The height of orifices 116 should also be adjusted such that there is a sufficient volume of air above surface 120 to provide adequate flow damping.

While the preferred embodiments of the invention have been illustrated and described, it should be understood that variations will be apparent to those skilled in the art. Accordingly, the invention is not to be limited to the specific embodiments illustrated and described, and the true scope and spirit of the invention are to be determined by reference to the appended claims.

I claim:

1. An apparatus for reducing flow pulsations in a fuel system for a liquid fuel engine, the fuel system comprising a fuel tank and a pump for causing fuel to flow through a fuel flow path from the fuel tank through the pump to the engine, the apparatus comprising:

gas inlet means for introducing gas into the fuel flow path; and damping means located in the fuel flow path between the pump and the engine for damping flow pulsations in the fuel, the damping means including means for containing a volume of gas in communication with the fuel flowing through the damping means such that flow pulsations in the fuel are transmitted to and damped by the gas, and separation means for automatically removing gas from the damping means at approximately the same rate as the gas is introduced by the gas inlet means, such that said volume of gas is substantially constant over time and such that the fuel flowing from the damping means towards the engine is substantially free of gas.

2. The apparatus of claim 1, wherein the damping means comprises a first conduit for receiving fuel that has passed through the pump, container means forming a chamber in communication with the first conduit, a second conduit in communication with the chamber for carrying fuel from the chamber towards the engine, and wherein the separation means comprises a third conduit for carrying fuel and gas from the chamber and means forming an orifice positioned within the chamber for allowing fuel and gas to flow from the chamber into the third conduit.

3. The apparatus of claim 2, wherein the gas inlet means is operative to introduce the gas into the chamber.

4. The apparatus of claim 2, wherein the orifice has a fixed size that is selected to produce maximum fuel flow rate through the orifice of 2–4 gallons per hour.

5. The apparatus of claim 2, wherein the damping means is adapted to cause fuel to flow from the first conduit into the chamber at an entry level positioned near the bottom of the chamber, and to cause fuel to flow from the chamber into the second conduit at an exit level positioned above the entry level, and wherein the orifice is positioned above the entry and exit levels.

6. The apparatus of claim 5, wherein the third conduit comprises a hollow tube positioned partially within the second conduit and extending to a level above the second conduit, the orifice being positioned in the tube at a level above the exit level, the height of the orifice above the exit level being sufficient to avoid entrainment of gas in the fuel flowing out of the container through the second conduit, and being further selected such that there is a sufficient volume of gas above the orifice to provide adequate damping of flow pulsations.

7. The apparatus of claim 1, wherein the gas inlet means is operative to introduce gas into the fuel flow path at a rate of approximately 1 cubic foot per hour at 28 psi.

8. The apparatus of claim 1, wherein the gas inlet means is positioned to introduce gas into the fuel flow path upstream of the damping means, wherein the damping means comprises a first conduit for receiving fuel that has passed through the pump, container means forming a chamber in communication with the first conduit, and a second conduit in communication with the chamber for carrying fuel from the chamber towards the engine, and wherein the separation means is operative to remove from the damping means gas that enters the damping means through the first conduit.

9. An apparatus for measuring the fuel consumed by a liquid fuel engine, the engine having associated with it a fuel tank and a pump for causing fuel to flow through a fuel flow path from the fuel tank through the pump to the engine, the apparatus comprising:

a flow sensor positioned in the fuel flow path between the pump and the engine;

gas inlet means for introducing gas into the fuel flow path; and damping means located in the fuel flow path between the pump and the flow sensor for damping flow pulsations in the fuel, the damping means including means for containing a volume of gas in communication with the fuel flowing through the damping means such that flow pulsations in the fuel are transmitted to and damped by the gas, and separation means for automatically removing gas from the damping means at approximately the same rate as the gas is introduced by the gas inlet means, such that said volume of gas is substantially constant over time and such that the fuel flowing from the damping means towards the engine is substantially free of gas.

10. The apparatus of claim 9, wherein the damping means comprises a first conduit for receiving fuel that has passed through the pump, container means forming a chamber in communication with the first conduit, a second conduit in communication with the chamber for carrying fuel from the chamber towards the engine, and wherein the separation means comprises a third conduit for carrying fuel and gas from the chamber and means forming an orifice positioned within the chamber for allowing fuel and gas to flow from the chamber into the third conduit.

11. The apparatus of claim 10, wherein the gas inlet means is operative to introduce the gas into the chamber.

12. The apparatus of claim 10, wherein the orifice has a fixed size that is selected to produce a maximum fuel flow rate through the orifice of 2–4 gallons per hour.

13. The apparatus of claim 10, wherein the damping means is adapted to cause fuel to flow from the first conduit into the chamber at an entry level positioned near the bottom of the chamber, and to cause fuel to flow from the chamber into the second conduit at an exit level positioned above the entry level, and wherein the orifice is positioned above the entry and exit levels.

14. The apparatus of claim 13, wherein the third conduit comprises a hollow tube positioned partially within the second conduit and extending to a level above the second conduit, the orifice being positioned in the tube at a level above the exit level, the height of the orifice above the exit level being sufficient to avoid entrainment of gas in the fuel flowing out of the container through the second conduit, and being further selected such that there is a sufficient volume of gas above the orifice to provide adequate damping of flow pulsations.

15. The apparatus of claim 9, wherein the gas inlet means is operative to introduce gas into the fuel flow path at a rate of approximately 1 cubic foot per hour at 28 psi.

16. The apparatus of claim 9, wherein the gas inlet means is positioned to introduce gas into the fuel flow path upstream of the damping means, wherein the damping means comprises a first conduit for receiving fuel that has passed through the pump, container means forming a chamber in communication with the first conduit, and a second conduit in communication with the chamber for carrying fuel from the chamber towards the engine, and wherein the separation means is operative to remove the damping means gas that enters the damping means through the first conduit.

17. A method for reducing flow pulsations in a fuel system for a liquid fuel engine, the fuel system comprising a fuel tank and a pump for causing fuel to flow through a fuel flow path from the fuel tank through the pump to the engine, the method comprising:

providing a chamber in the fuel flow path between the pump and the engine;

introducing a gas into the fuel flow path such that the gas flows into the chamber and forms therein a volume of gas in communication with the fuel flowing through the chamber, such that flow pulsations in the fuel are transmitted to and damped by the gas in the chamber; and removing gas from the chamber at approximately the same rate as the gas is introduced into the fuel flow path, such that the volume of gas in the chamber is substantially constant over time and such that fuel flowing from the chamber towards the engine is substantially free of gas.

18. The method of claim 17, further comprising providing an orifice positioned within the chamber for allowing gas and fuel to flow from the chamber.

19. The method of claim 18, wherein the orifice has a fixed size that is selected to produce a maximum fuel flow rate through the orifice of 2–4 gallons per hour.

20. The method of claim 17, wherein the gas is introduced into the fuel flow path at a rate of approximately 1 cubic foot per hour at 28 psi.

21. A method for measuring the fuel consumed by a liquid fuel engine, the engine associated with it a fuel tank and a pump for causing fuel to flow through a fuel flow path from the fuel tank through the pump to the engine, and the method comprising:

measuring the rate of fuel flow to the engine by means of a flow sensor positioned in the fuel flow path between the pump and the engine;

providing a chamber in the fuel flow path between the pump and the flow sensor;

introducing a gas into the fuel flow path such that the gas flows into the chamber and forms therein a volume of gas in communication with the fuel flowing through the chamber, such that the flow pulsations in the fuel are transmitted to and damped by the gas in the chamber; and removing gas from the chamber at approximately the same rate as the gas is introduced into the fuel flow path, such that the volume of gas in the chamber is substantially constant over time and such that fuel flowing from the chamber towards the engine is substantially free of gas.

22. The method of claim 21, wherein the engine has associated with it a return flow line for carrying unused fuel from the engine back to the fuel tank, the method further comprising measuring the rate of fuel flow from the engine by means of a return flow sensor positioned in the return flow line.

23. The method of claim 22, further comprising providing an orifice positioned within the chamber for allowing gas and fuel to flow from the chamber.

24. The method of claim 23, wherein the orifice has a fixed size that is selected to produce a maximum fuel flow rate through the orifice of 2–4 gallons per hour.

25. The method of claim 22, wherein the gas inlet means is operative to introduce gas into the fuel flow path at a rate of approximately 1 cubic foot per hour at 28 psi.

* * * * *

UNITED STATES PATENT AND TRADEMARK OFFICE
CERTIFICATE OF CORRECTION

PATENT NO. : 4,590,796
DATED : May 27, 1986
INVENTOR(S) : Wilfried Baatz

It is certified that error appears in the above-identified patent and that said Letters Patent is hereby corrected as shown below:

Column 3, line 42, "air flow" should be --airflow--
Column 4, line 10, "94" should be --98--
Column 5, line 18, Insert --a-- before "maximum"
(Claim 4, line 2)
Column 6, line 54, Insert --from-- after "remove"
(Claim 16, line 10)
Column 7, line 17, Insert --having-- before "associated"
(Claim 21, line 2)
Column 8, line 2, Delete "the" before "flow"
(Claim 21, line 14)

Signed and Sealed this

Twenty-sixth Day of August 1986

[SEAL]

Attest:

DONALD J. QUIGG

Attesting Officer  Commissioner of Patents and Trademarks